United States Patent [19]

Hunt

[11] 4,226,011

[45] Oct. 7, 1980

[54] MANUFACTURING METHOD FOR METALIZED PLASTIC DIELECTRIC CAPACITORS FOR IMPROVED CURRENT CAPABILITIES

[75] Inventor: Delbert E. Hunt, Ogallala, Nebr.

[73] Assignee: TRW Inc., Los Angeles, Calif.

[21] Appl. No.: 206

[22] Filed: Jan. 2, 1979

[51] Int. Cl.³ .................... H01G 4/18; H01G 1/14
[52] U.S. Cl. .................... 29/25.42; 361/309; 427/79
[58] Field of Search ............... 361/309, 323; 29/25.42; 427/79

[56] References Cited

U.S. PATENT DOCUMENTS 3,284,684  11/1966  Gaenge ........................ 361/309

FOREIGN PATENT DOCUMENTS 212959  2/1958  Australia ........................ 361/323

Primary Examiner—E. A. Goldberg
Attorney, Agent, or Firm—Martin R. Horn

[57] ABSTRACT

An improved method for the attachment of lead electrodes to metallized film capacitors is disclosed herein. Capacitors of this type are formed by winding thermoplastic dielectric films, each having a conductive coating, into a coil and applying conductive electrodes to the opposite axial ends of the coil, forming an electrical bond with the metallized surfaces of the dielectric windings. The invented method provides for a two part heat curing of the capacitor. After the capacitor is wound into a coil, it is clamped and then heated at a moderate temperature below its rated operating temperature for a sufficient period of time so as to impart mechanical stability to the device. A "schooping" material is then sprayed on the axial ends of the capacitor, allowing for the deep penetration of the material between offset layers of the capacitor. Finally the capacitor is heated at a temperature above its rated operating temperature for a period of time sufficient to cause the dielectric films to contract into a tightly wound coil. The leads for the capacitor are then soldered onto the coil. The two part heat cure prevents the curling of the edges of the capacitor before the schooping process, allowing for greater penetration of the schooping material. This increase in penetration of the schooping material allows the capacitor to be used in applications requiring a higher current density then is possible by prior art methods.

11 Claims, 6 Drawing Figures

MANUFACTURING METHOD FOR METALIZED PLASTIC DIELECTRIC CAPACITORS FOR IMPROVED CURRENT CAPABILITIES

BACKGROUND OF THE INVENTION

1. Field of the Invention

The disclosed invention is an improvement upon the methods of manufacture of capacitors of the type formed by plural windings of metallized thermoplastic films or sheets.

2. Prior Art

Metallized thermoplastic capacitors are formed from sheets of thermoplastic dielectric materials. The sheets are coated with a conductive material such as aluminum or zinc and wound into a coil. The conductive coatings are electrically paired, thereby forming the two plates of the capacitor. In winding the sheets into a coil it is the usual practice to offset the edge of the layers containing the conductive coatings which will be used for one element of the capacitor with respect to the remaining layers. In this way the layers which will be electrically connected together to form an element of the capacitor are axially offset at one end of the capacitor coil. At the other end of the coil the conductive layers which will form the other element of the capacitor will be similarly offset. By so offsetting the dielectric sheets in the coil, it is easier to electrically connect the lead electrodes to the conductive coatings.

After winding the capacitor into a coil it is traditionally clamped about its axis and heated for an extended period of time, causing the thermoplastic dielectric films to contract slightly creating a mechanically stable package. It has been found that when such heating is done the offset edges of the dielectric films tend to curl and close up the gaps between them.

After the heat treatment, a "schooping" process is performed, whereby a conductive material is bonded to the conductive coatings which are offset on each end. The usual practice in the industry is to flame solder a low melting temperature alloy onto the axial ends of the capacitor. Flame soldering consists in the spraying of molten metal onto the axial ends of the device. The gaps between the layers offset on each end are allowed to partially fill with the schooping material. The schooping material, being conductive, forms an electrical contact with the desired conductive coatings. In addition lead electrodes may be more readily soldered to the schooping material than to the fragile conductive coatings. Lead electrodes are then attached to the schooping material.

Because of the edge curl of the dielectric films due to the one step heat processing, the schooping material is usually unable to penetrate between the offset layers on the end of the capacitor as deeply as would be desired. This lack of penetration causes the capacitor to be restricted in the range of current densities for which it may be used. The lack of penetration causes an electrical connection having higher resistance than desirable to be formed between the schooping material and the conductive films, restricting the range of applications for capacitors manufactured by this method.

SUMMARY OF THE INVENTION

It is the object of the herein disclosed invention to provide a method which allows for the deeper penetration of the schooping material between the layers offset on the axial end of the capacitor, thereby providing for a lower resistance electrical connection between the schooping and the conductive coatings of the dielectric films. A further objective of the herein disclosed invention is to extend the range of uses for metallized film capacitors to those applications requiring a greater current handling capability than was possible by the prior art.

DETAILED DESCRIPTION OF THE PREFERRED EMBODIMENT

Figure 1:
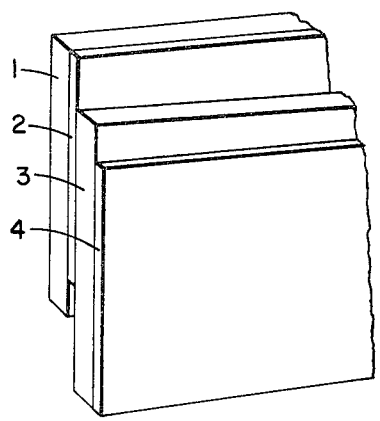
FIG. 1 is a perspective view of the thermoplastic dielectric and conductive films of a capacitor before being wound into a coil.

FIG. 1 illustrates plural layers 1, 3 of thermoplastic dielectric films which will be used to form a capacitor. Each of the layers contains on one side a conductive film coating 2, 4 which will be electrically connected to one or the other of the lead electrodes. The conductive coatings form the elements of the capacitor, whereas the thermoplastic film formed the dielectric between the elements of the capacitor. Between any two adjacent conductive coatings there will be a dielectric film, preventing the conductive coatings from electrically contacting each other. FIG. 1 also illustrates how alternating layers of the thermoplastic dielectric films are offset with respect to each other, so that after the films are wound into a coil alternating layers of the films will be offset on opposite sides of the axial ends of the coil.

The thermoplastic films which are used in such capacitors are well known in the industry, e.g., polyester films, polycarbonate films, polypropylene films, polysulfone films, and the like all exhibit the desired properties of acting as a good dielectric insulator between the elements of the capacitor, providing a self healing dielectric, as well as providing a mechanical rigidity to the capacitor after having been heat treated. Typically such films, when heated to a temperature commonly in the range of 110 degrees C. to 160 degrees C. tend to slightly soften and contract. Upon cooling, the film rehardens, without corresponding expansion, thereby forming a mechanically rigid and stable device.

The conductive coatings placed on the films are of a well known class of materials such as aluminum, zinc and the like. The coatings are typically applied by evaporating an extremely thin coating on the order of 2–3 millionth of an inch or less onto the dielectric films. In some instances, rather than evaporating the conductive coating on to the dielectric film, a separate conductive foil is used.

In FIG. 1, film 1 is illustrated as being offset with respect to film 3. The upper horizontal edge of film 1 extend beyond the corresponding horizontal edge of film 3. On the lower edges of the films, the roles of the two films are reversed. Film 3 extends beyond the corresponding lower horizontal edge of film 1.

Figure 2:
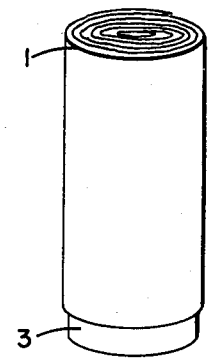
FIG. 2 illustrates the films wound into a coil before heat treatment.

The first step in the manufacture of a capacitor is to tightly wind the dielectric films containing the conductive coatings into a coil. FIG. 2 illustrates the assembly at this point in the process. The upper axial end of the coil contains the offset ends of the film 1. Visible at the lower end of the coil is the offset edge of film 2.

Figure 3:
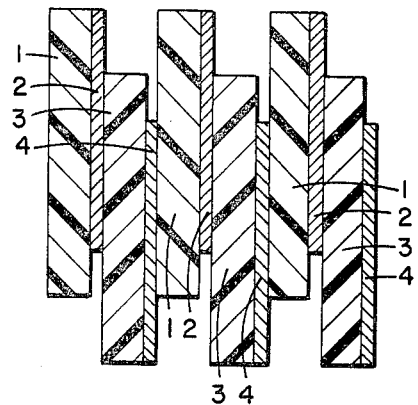
FIG. 3 is a partial sectional view of the wound film coil before heat treatment.

A partial sectional view of the coil of dielectric films and conductive coatings is illustrated in FIG. 3. The coil will typically contain many turns of the films, therefore FIG. 3 illustrates three windings of films 1 and 3. In FIG. 3 dielectric film 1 is shown as offset upwardly with respect to film 3. Similarly, film 3 is offset downwardly with respect to film 1, so as to cause dielectric film 3 to extend below film 1. The conductive coating 4 which is associated with dielectric film 3 does not completely cover the dielectric film 3. The upper edge of dielectric film 3 is not covered by the conductive coating. This is a common prior art method of manufacturing such capacitors which allows a recessed conductive coating, e.g. 4, additional separation from the schooping material which will be applied to the gaps between the offset film, e.g., 1. Similarly, the conductive coating 2 does not extend to the lower edge of its associated dielectric film, 1.

Figure 4:
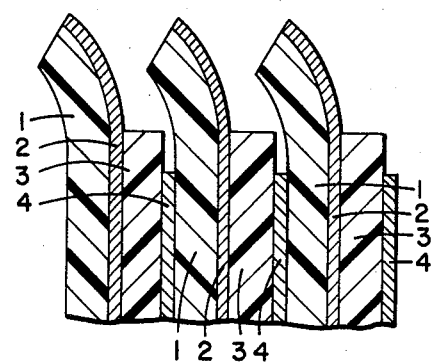
FIG. 4 is a partial sectional view identical to FIG. 3 illustrating the edge curl of the dielectric films caused by the prior art one step heat treatment.

After the dielectric films are wound into a coil the coil is then clamped about its axis and heated for an extended period of time. The period of time used by the prior art is sufficient for the dielectric films to soften and contract, pulling the coil into a tightly wound mechanically stable package. This heating does not adversely affect the films or their coatings. However, the offset edges of the films have a tendency to curl due to the contraction of the films. This curl is due to the fact that the contracting films on the offset edges are not in contact with each other. The gap between the films allows the films to curl, partially closing off the gap. This edge curl is portrayed in FIG. 4, where the gaps between windings of film 1 at the offset end have been partially closed due to the contraction of the film during the heat curing.

Figure 5:
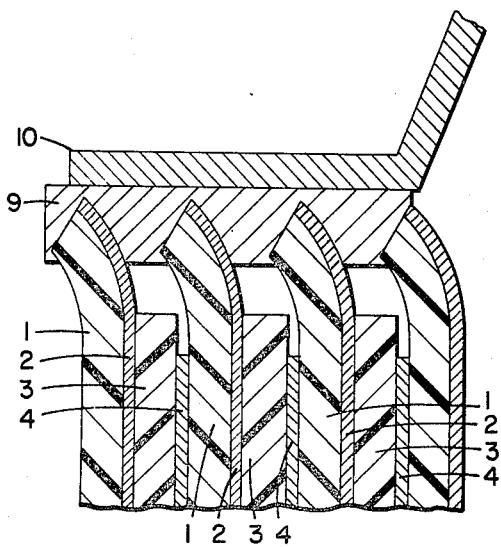
FIG. 5 is a partial sectional view identical to FIG. 3 illustrating the edge curl of the dielectric films caused by the prior art and the resulting minimal penetration of the schooping material.

After the heat curing, the prior art process continues by bonding of a conductive material 9 on the offset ends of the capacitors. The coatings on the films are of a fragile nature, therefore special production techniques have been found necessary to attach the lead electrodes 10 to the conductive coatings. The typical production method is the flame spraying of a molten metal 9 on to the axial ends of the capcitor. The molten metal 9 is chosen to have a melting point sufficiently low so as to not cause damage to the fragile films, yet have a melting point sufficiently above the rated operating temperature of the device so as to not loosen under expected temperature conditions. Typical materials used for this bonding process, called schooping, are low temperature solders, tin, or tin based alloys such as a Spray Babbit A, a material known in the industry. In addition, aluminum and copper are used in some instances. The schooping is usually applied by use of a flame spray process in which the metal is heated up to its melting point, and then sprayed by an apparatus onto the ends of the capacitor. Since it is molten, the schooping tends to fill in between the offset layers of the capacitor. The penetration of the schooping between the ends of the films is a vital aspect of the manufacture of the capacitor since it is the penetration which determines the amount of contact which the schooping 9 has with respect to the conductive coatings. As mentioned the coatings are typically of extremely thin material, therefore in order to reduce the resistance between the schooping and the coatings, it is necessary for the shooping to contact the coatings in as large an area as is possible. FIG. 5 illustrates the penetration of the schooping material when the prior art "one-step" heat treatment is used. The edge curl of the capacitor prevents the schooping from penetrating as deep as would be possible between the dielectric film layers. After the bonding of the schooping to the capacitor coil, a lead electrode 10 is attached to each end of the capacitor. The method of attaching the lead electrodes is well known in the industry. Such techniques as resistance soldering, or resistance welding are typically used in order to provide a sound mechanical and electrical connection between the lead electrode and the schooping, without causing injury to the dielectric films or conductive coatings.

The prior art "one-step" heat treatment of the capacitor coil restricts the range of applications for which such capacitors may be used. As discussed, the edge curl causes a lack of penetration of the schooping between the offset edges of the coil, creating a higher resistance connection between the schooping and the conductive coatings then would be desirable in certain applications. It has been found that although the capacitors manufactured by such a one step heat treatment are satisfactory for many applications, their suitability for alternating current or pulse type applications is limited due to the current handling capabilities of the connection between the schooping and the thin coatings.

It has been found that a two step heat treating of the capacitor coil can avoid the edge curl caused by prior art methods, while simultaneously improving the current handling capabilities of capacitors manufactured by the herein disclosed method.

Specifically, after the dielectric films and their associated conductive coatings are wound into a coil, the coil is clamped about its axis and heated for a relatively short period of time at a temperature below the rated operating temperature of the capacitor. This first heat treatment is meant to cause the dielectric films to slightly soften and minimally contract. Such contraction causes a sound mechanical package to be formed by the coil without causing the edge curl as found in the prior art methods. The goal of such heat treatment is to create a mechanical package which is sufficiently strong so as to be able to be subjected to the schooping process, yet not have been heated to such a degree as to cause the edge curl on the dielectric films. At this point in the production process it is not necessary to heat the coil sufficiently to create a mechanical package of sufficient strength for its permanent use.

After the first heat treatment, the schooping material is bonded to the axial ends of the capacitor in a manner similar to that previously discussed. It has been found that a maximal penetration of the schooping can be assisted by the flame spraying of the schooping directly onto the axial ends. If the schooping is sprayed at an angle to the ends, maximal pentration is possibly hindered.

After the schooping has been applied to the axial ends of the coil, the second heat treatment process is initiated. The coil is reclamped and heated for an extended period of time, so as to cause the maximal increase in mechanical rigidity of the coil, without endangering the electrical properties of the device.

Figure 6:
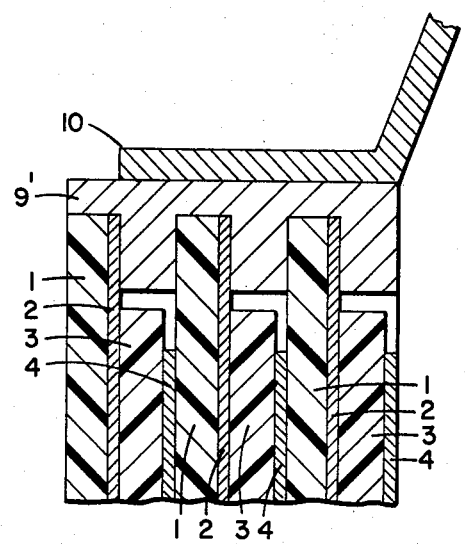
FIG. 6 is a partial sectional view identical with FIG. 3 showing the penetration of the schooping material when the herein disclosed method is used.

FIG. 6 illustrates the effect of the herein disclosed method. The schooping material 9' penetrates the offset layers of the dielectric films in a greater manner than that possible by the prior art methods. The schooping has a greater amount of contact with the conductive coatings, thereby allowing the capacitor to be used for applications requiring a higher current density than that previously possible. The lead electrode 10 can be applied by the conventional methods found in the prior art, such as resistance soldering or welding.

The two part heat treatment for the manufacture of capacitors has been found applicable to a wide range of thermoplastic dielectric films. All commonly used thermoplastic films can be used in this two part heat treatment. Although the exact temperatures required for the heat treatment vary from one type of film to another, the process involved is not highly critical. For instance, when polyester films are used as the dielectric material, such films having a melting point of approximately 250 degrees C., it has been found that after clamping the capacitor, it should be initally heated in the range 70 degrees C. to 80 degrees C. for approximately one to four hours. This temperature is considerably below the rated operating temperature (125 degrees C.) of capacitors using such films. It has been found that the lower temperature serves to cause the dielectric films to slightly contract, creating a mechanical package which is sufficiently stable to undergo application of the schooping. After the short heat treatment at low temperature, the schooping is then applied by conventional methods. As already mentioned, for maximum penetration of the schooping between the offset layers the schooping should be sprayed directly toward the ends of the capacitor. All traditional schooping materials such as low temperature solders, tin, or tin based babbit alloys, e.g. Spray Babbit A, a material known in the industry, may be effectively used. After the schooping has been attached, a second extended heat treatment is performed on the capacitor after it is reclamped. Typically for polyester films, the capacitor is heated on the order of 5–20 hours at a temperature above its 125 degrees operating temperature of about 135 degrees to 140 degrees C. At this temperature the dielectric film tightly contracts into a reliable and mechanically stable package, without mechanical or electrical injury to the schooping material, the conductive coatings, or the dielectric material. After this second heat treatment, the lead electrodes of the capacitor are attached in a conventional manner.

For polycarbonate dielectric films it has been found that the initial heat treatment should be performed at a temperature of 100 degrees to 110 degrees C. for about 1-4 hours. This temperature allows the polycarbonate film to sufficiently contract so as to create a stable mechanical package for the schooping process. After the schooping has been applied, an extended heat treatment of approximately 5-20 hours in the temperature range of 140 to 150 degrees C. has been found to be a convenient and effective second heat treatment cycle. Such dielectric films made of polysulfone follow a similar temperature and time processing as polycarbonate films. Typically polysulfone films have a rating temperature of approximately 155 degrees C., therefore the second part heat treatment occurs at a temperature above this temperature.

Polypropylene dielectric films have been found to require an initial treatment of approximately 70 degrees C. for 1-4 hours and a final heat treatment of 110 degrees C. for 5-20 hours. This package creates a capacitor which will have a rated operating temperature of approximately 100 degrees C.

The temperatures and times discussed for the various types of dielectric films, have not been found to be highly critical. The initial heat treatment serves only to cause the films to slightly contract, creating a mechanical package which can be easily used in the schooping process. The extended heat treatment which follows the schooping process serves to cause the dielectric films to further contract, creating a permanent and mechanically reliable package. Other types of dielectric films maybe used in a corresponding manner and this invention is not meant to be limited to the particular films discussed. Correspondingly, the temperature ranges and heat treatment times are not critical, and the invention should not be limited to the discussed detailed procedures. For instance it has been found that the initial heat treatment is adjustable in its parameters. For instance a film may be heated at a slightly higher temperature than that mentioned for a correspondingly shorter period of time. The result however must be the same, that is the initial treatment must serve to create a mechanical package for the capacitor which avoids edge curl and other damage to the package, while simultaneously providing a mechanical package which is stable enough for use in the schooping process. The second part heat treatment is a method standard in the industry, and the parameters of the treatment depend upon the particular properties of the dielectric films. The temperature used must be above the rated operating temperature of the capacitor so as to provide a stable permanent mechanical package for the capacitor at its rated operating temperature. However the exact temperature used and the duration of the heat treatment is variable within a range of limits.

It has been found that capacitors using the two part heat treatment may be used in applications not previously possible for such capacitors. For instance, the capacitors constructed by the herein disclosed method have been found suitable for pulse type and other A.C. applications which were previously inappropriate for such capacitors due to current density limitations. The increased penetration of the schooping material and its corresponding increased contact with the conductive coatings extends the current density limitations, allowing new applications to be supported by capacitors manufactured by the herein disclosed method.

While only a limited number of embodiments of the present invention have been discussed herein, it will be readily apparent to persons skilled in the art that certain changes and modifications in the process may be made without departing from the spirit of the invention. Accordingly the foregoing disclosure and description are for illustrative purposes only and do not in any way limit the invention, which is defined only by the claims.

I claim:

1. A method for manufacturing multi-layered capacitors, each layer consisting of a thermoplastic dielectric film and a conductive film associated therewith, different sets of conductive films being electrically connectable to separate lead electrodes, said method comprising:

winding said layers into a coil, said layers being positioned with respect to one another so that at one axial end of said coil the conductive films of one set and the dielectric films associated therewith project axially beyond the edges of the remaining layers;

initially heating said coil at a temperature below the rated operating temperature of said capacitor for a period of time sufficient to cause the initial contraction of said thermoplastic dielectric films;

bonding a conductive bonding material to the axially extending conductive films at least at said one axial end of said coil, said bonding material penetrating between the axially projecting layers so as to form an electrical connection with the conductive films of the projecting layers while not contacting the conductive films of the layers which do not project axially;

subsequently heating said coil to above the rated operating temperature of said capacitor for a period of time sufficient to cause the dielectric films to contract into a mechanically rigid package without adversely affecting the electrical properties of the said dielectric films, said conductive films or said bonding material.

2. A method according to claim 1 wherein said bonding comprises flame spraying said conductive bonding material onto and between said projecting layers.

3. A method according to claim 2 wherein said flame spraying is performed in a direction along the longitudinal axis of said coil and directly toward the axial ends of said coil.

4. A method according to claim 1 wherein said conductive bonding material consists of a low temperature solder with a melting point higher than the rated operating temperature of the capacitor being assembled.

5. A method according to claim 1 wherein said conductive bonding material consists of a spray babbit alloy with a melting point higher that the rated operating temperature of the capacitor being assembled.

6. A method according to claim 1 further comprising the step of electrically and mechanically attaching lead electrodes to said conductive bonding material.

7. A method according to claim 1 wherein said thermoplastic dielectric film consists primarily of polyester material; wherein said initial heating is carried out in the temperature range of 70-80 degrees C. for approximately 1-4 hours, and wherein said subsequent heating is carried out at 135-140 degrees C. for a period of time about 5-20 hours.

8. A method according to claim 1 wherein said thermoplastic dielectric film consists primarily of polycarbonate material, wherein said initial heating is carried out in the temperature range of 100-110 degrees C. for approximately 1-4 hours; and wherein said subsequent heating is carried out at 140-150 degrees C. for a period of time about 5-20 hours.

9. A method according to claim 1 wherein said thermoplastic dielectric film consists primarily of polypropylene material, wherein said initial heating is carried out in the temperature range of 70-80 degrees C. for approximately 1-4 hours, and wherein said subsequent heating is carried out at 110-115 degrees C. for a period of time about 5-20 hours.

10. A method according to claim 1 wherein said thermoplastic dielectric film consists primarily of polysulfone material; wherein said initial heating is carried out in the temperature range of 100-110 degrees C. for approximately 1-4 hours; and wherein said subsequent heating is carried out at 160-165 degrees C. for a period of time about 5-20 hours.

11. A method according to claim 1 wherein said conductive bonding material is schooping.

* * * * *